United States Patent Office 2,753,342
Patented July 3, 1956

2,753,342

CYCLOPENTANOPHENANTHRENE COMPOUNDS AND METHOD FOR THE PRODUCTION THEREOF

Carl Djerassi, Birmingham, Mich., and Franz Sondheimer and George Rosenkranz, Mexico City, Mexico, assignors to Syntex S. A., Mexico City, Mexico, a corporation of Mexico No Drawing. Application October 18, 1954, Serial No. 463,034

Claims priority, application Mexico October 16, 1953

6 Claims. (Cl. 260—239.55)

The present invention relates to novel cyclopentanophenanthrene compounds and to a novel method for the production thereof.

More particularly, the present invention relates to a novel method for the production of an active cortical hormone $\Delta^4$-19-nor-pregnene-17$\alpha$, 21-diol-3,20-dione, and to certain novel intermediates for the production of this compound.

The final product of the process of the present invention, which is the 19-nor homologue of the important cortical hormone known as Richstein's substance S, like substance S is an active cortical hormone and in addition is an important intermediate for the production of the active cortical-type hormone $\Delta^4$-19-nor-pregnene-11$\beta$,17$\alpha$,21-triol-3,20-dione (the 19-nor homologue of Kendall's compound F), since this last compound may be derived from the final product of the present invention by adrenal gland incubation or by biochemical oxygenation.

In accordance with the present invention, there has been discovered a novel method for the production of $\Delta^4$-19-nor-pregnene-17$\alpha$,21-diol-3,20-dione starting from 3,17$\alpha$-dihydroxy-17$\beta$-(hydroxyacetyl)-1,3,5(10)-estratriene which has been disclosed in the United States application of Djerassi and Lenk, Serial No. 435,084, filed June 7, 1954, by converting this compound to the 20-ethylene ketal followed by the production from this compound of the novel 3-alkyl-ether thereof, namely the 20-ketal 3-alkyl-ether of 3,17$\alpha$-dihydroxy-17$\beta$-(hydroxyacetyl)-1,3,5(10)-estratriene. This last-mentioned novel intermediate may be converted by the process of the present invention to the corresponding $\Delta^{2,5(10)}$-compound which in turn may be converted to the desired final product previously referred to.

The novel process of the present invention may be outlined in accordance with the following equation:

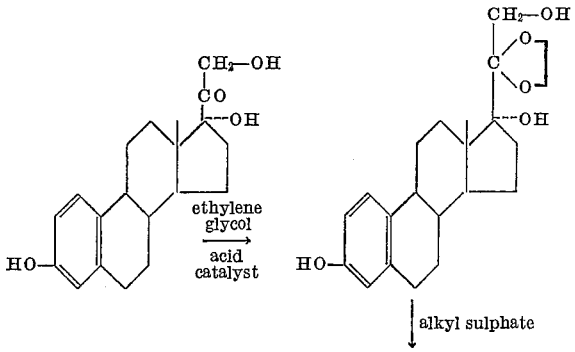

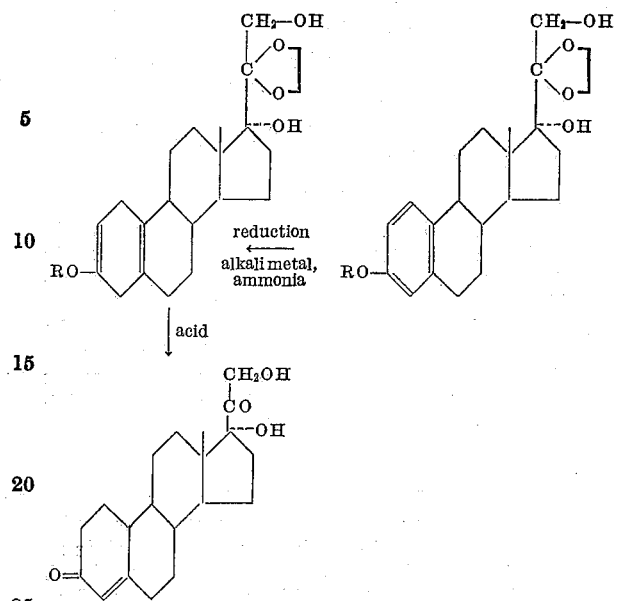

In the above equation R represents an alkyl group, preferably a lower alkyl group such as methyl or ethyl.

In practicing the process above outlined 3,17$\alpha$-dihydroxy-17$\beta$-(hydroxy-acetyl)-1,3,5(10)-estratriene is dissolved in an inert organic solvent such as benzene and mixed with a ketalizing agent such as a lower alkyl glycol, preferably ethylene glycol, in the presence of a catalytic amount of an acid catalyst such as p-toluenesulphonic acid. The mixture is then reacted for a substantial period of the order of 7 hours preferably under reflux conditions. The resultant product, i. e., the 20-ketal of 3,17$\alpha$-dihydroxy-17$\beta$-(hydroxy-acetyl)-1,3,5(10)-estratriene is then purified and recrystallized from an organic solvent.

For the second step of the above-outlined process, the 20-ketal is dissolved in an organic polar solvent preferably a lower alcohol such as ethanol and then treated successively and alternately with a strong solution of a base preferably an alkali metal hydroxide solution such as 50% potassium hydroxide and with a lower alkyl sulphate such as methyl sulphate. After a number of such treatments, for example four, the solution is cooled and diluted with water to precipitate the 20-ketal 3-lower alkyl ether of 3,17$\alpha$-dihydroxy-17$\beta$-(hydroxy-acetyl)-1,3,5(10)-estratriene.

Reduction of the 3-lower alkyl ether of the previous step is performed preferably by dissolving the compound in an organic solvent, such as anhydrous-dioxane, and adding the solution to an alkali metal such as lithium or sodium in liquid ammonia. Preferably the steroid solution is added dropwise over a short period such as a few minutes. After a short further period, absolute ethanol is added dropwise. The ammonia is then allowed to evaporate at room temperature and the residue is collected with cold water. The crude product upon extraction with an organic solvent such as ether, washing with water to neutral, drying and evaporation is the 20-ketal of 3-lower alkoxy-$\Delta^{2,5(10)}$-19-nor-pregnadiene-17$\alpha$,21-diol-20-one which could be further purified or utilized as such for the final step of the reaction.

For the last step outlined above, the crude product just referred to is dissolved in a polar organic solvent such as a lower aliphatic alcohol and treated with a mineral acid such as hydrochloric. Upon purification $\Delta^4$-19-nor-pregnene-17$\alpha$,21-diol-3,20-dione is produced.

The following specific examples serve to illustrate but are not intended to limit the present invention.

Example I

A solution of 2 g. of 3,17$\alpha$-dihydroxy-17$\beta$-(hydroxyacetyl)-1,3,5(10)-estratriene in 70 cc. of benzene was mixed with 20 cc. of ethyleneglycol and a trace of p-toluenesulphonic acid and the mixture was refluxed under continuous stirring for 7 hours with an attachment for the removal of the water formed during the reaction. The soltuion was washed with aqueous sodium carbonate solution and water, dried over sodium sulphate, evaporated to dryness and recrystallized from acetone-hexane, thus giving 0.7 g. of the 20-ketal.

Example II 0.6 g. of the 20-ketal of Example I was dissolved in 50 cc. of ethanol and the solution was treated alternatively four times with 1.5 of a 50% solution of potassium hydroxide and 1.55 cc. of methyl sulphate. After 10 minutes the solution was cooled, diluted with water and the precipitate was collected. Recrystallization from hexane containing a small percentage of acetone afforded crystals of the 20-ketal 3-methyl-ether of 3,17$\alpha$-dihydroxy-17$\beta$-(hydroxy-acetyl)-1,3,5(10)-estratriene.

Example III

A solution of 0.5 g. of the 3-methyl-ether of Example II in 50 cc. of dioxane was added in the course of 4 minutes to a solution of 0.5 g. of lithium metal (wire) in 50 cc. of liquid ammonia placed in a Dewar flask fitted with a mechanical stirrer. After waiting for 10 minutes, 5 cc. of absolute ethanol was added dropwise. The ammonia was left to evaporate at room temperature and the residue was collected with cold water and extracted with ether. The ether solution was washed to neutral, dried and evaporated to dryness. The crude product thus obtained was dissolved in 25 cc. of methanol and mixed with 2 cc. of 3-normal hydrochloric acid and the mixture was kept for 15 minutes at a temperature of 40° C. After cooling, ether and water were added and the organic layer was washed to neutral, dried over sodium sulphate and concentrated to a small volume. Direct crystallization yielded $\Delta^4$-19-nor-pregnene-17$\alpha$,21-diol-3,20-dione, having a melting point of 178°–180° C.

We claim:

1. A method for the preparation of 19-nor-pregnene-17$\alpha$,21-diol-3,20-dione which comprises forming a 20-ketal 3-lower alkyl ether derivative of 3,17$\alpha$-dihydroxy-17$\beta$-(hydroxyacetyl)-1,3,5(10)-estratriene whereby the 20-keto group is protected from reduction, reducing the derivative with an alkali metal in liquid ammonia to form the 20-ketal of 3-lower alkoxy-$\Delta^{2,5(10)}$-19-nor-pregnadiene-17$\alpha$,21-diol-20-one, and treating this last mentioned compound with an acid.

2. The method of claim 1 wherein the lower alkyl is methyl.

3. A method for the production of 19-nor-pregnene-17$\alpha$,21-diol-3,20-dione which comprises reducing a 20-ketal 3-lower alkyl-ether of 3,17$\alpha$-dihydroxy-17$\beta$-(hydroxyacetyl)-1,3,5(10)-estratriene with an alkali metal in liquid ammonia to form the 20-ketal of 3-lower alkoxy-$\Delta^{2,5(10)}$-19-nor-pregnadiene and treating this last mentioned compound with an acid.

4. The process of claim 3 wherein the alkali metal is lithium and the lower alkyl is methyl.

5. The 20-ketal of 3-lower alkoxy-$\Delta^{2,5(10)}$-19-nor-pregnadiene-17$\alpha$,21-diol-20-one.

6. The 20-ketal of 3-methoxy-$\Delta^{2,5(10)}$-19-nor-pregnadiene-17$\alpha$,21-diol-20-one.

References Cited in the file of this patent

UNITED STATES PATENTS

| | | |
|---|---|---|
| 2,288,854 | Stavely | July 7, 1942 |
| 2,378,918 | Fernholz | June 26, 1945 |
| 2,622,081 | Bernstein | Dec. 16, 1952 |
| 2,623,885 | Miescher | Dec. 30, 1952 |
| 2,648,663 | Julian | Aug. 11, 1953 |
| 2,666,769 | Colton | Jan. 19, 1954 |